United States Patent
Xu et al.

(10) Patent No.: US 11,956,779 B2
(45) Date of Patent: *Apr. 9, 2024

(54) DOWNLINK CONTROL INDICATOR DISTRIBUTION FOR CROSS CARRIER SCHEDULING

(71) Applicant: QUALCOMM Incorporated, San Diego, CA (US)

(72) Inventors: Huilin Xu, Temecula, CA (US); Peter Pui Lok Ang, San Diego, CA (US); Wanshi Chen, San Diego, CA (US); Peter Gaal, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/826,342

(22) Filed: May 27, 2022

(65) Prior Publication Data

US 2023/0028483 A1   Jan. 26, 2023

Related U.S. Application Data

(63) Continuation of application No. 16/805,435, filed on Feb. 28, 2020, now Pat. No. 11,350,436.

(Continued)

(51) Int. Cl.
*H04W 72/12* (2023.01)
*H04L 5/00* (2006.01)
(Continued)

(52) U.S. Cl.
CPC ....... *H04W 72/1273* (2013.01); *H04L 5/0094* (2013.01); *H04W 72/0446* (2013.01); *H04W 72/046* (2013.01); *H04W 72/23* (2023.01)

(58) Field of Classification Search
None
See application file for complete search history.

(56) References Cited

U.S. PATENT DOCUMENTS 11,122,552 B2   9/2021   Lee et al.
11,350,436 B2   5/2022   Xu
(Continued)

FOREIGN PATENT DOCUMENTS

CN   108989007 A   12/2018
CN   109565784 A   4/2019
(Continued)

OTHER PUBLICATIONS

Huawei, et al., "Discussion on NR CA for Cross-Carrier Scheduling with Different Numerologies," 3GPP Draft, 3GPP TSG RAN WG1 Meeting #96, R1-1901580, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 25, 2019-Mar. 1, 2019, Feb. 16, 2019, (Feb. 16, 2019), XP051599277, 15 pages, Retrieved from the Internet: URL: http://www.3gpp.org/ftp/tsg%5Fran/WG1%5FRL1/TSGR1%5F96/Docs/R1%2D1901580%2Ezip [retrieved on Feb. 16, 2019], figures 9-10, sections 2-5.

(Continued)

*Primary Examiner* — Steve R Young
(74) *Attorney, Agent, or Firm* — Holland & Hart LLP

(57) ABSTRACT

Aspects relate to wireless communications utilizing cross carrier scheduling Methods and apparatus include generating at least one slot in a control channel from a scheduling cell, the at least one slot including a plurality of control channel segments such as PDCCH segments, which are arranged at respective times within the at least one slot. Each of the control channel segments includes control information such as DCIs corresponding to respective slots for a scheduled cell. Distributing the control channel information in (Continued)

segments or spans over time affords improved decoding timing in a UE in the scheduled cell.

41 Claims, 12 Drawing Sheets

Related U.S. Application Data

(60) Provisional application No. 62/849,761, filed on May 17, 2019, provisional application No. 62/843,235, filed on May 3, 2019.

(51) Int. Cl.
*H04W 72/04* (2023.01)
*H04W 72/044* (2023.01)
*H04W 72/0446* (2023.01)
*H04W 72/1273* (2023.01)
*H04W 72/14* (2009.01)
*H04W 72/23* (2023.01)

(56) References Cited

U.S. PATENT DOCUMENTS

| | | | |
|---|---|---|---|
| 2012/0213170 A1 | 8/2012 | Choi et al. | |
| 2017/0034808 A1 | 2/2017 | Ouchi et al. | |
| 2018/0310257 A1* | 10/2018 | Papasakellariou | H04W 72/23 |
| 2019/0268971 A1 | 8/2019 | Talarico et al. | |
| 2019/0306700 A1* | 10/2019 | Lin | H04W 24/08 |
| 2019/0349180 A1* | 11/2019 | Lu | H04L 27/2607 |
| 2020/0053757 A1 | 2/2020 | Bagheri et al. | |
| 2020/0128363 A1 | 4/2020 | Yavuz et al. | |
| 2020/0235891 A1 | 7/2020 | Lei et al. | |
| 2020/0275483 A1 | 8/2020 | Li et al. | |
| 2020/0337029 A1 | 10/2020 | Yi et al. | |
| 2020/0374060 A1* | 11/2020 | Wang | H04L 25/0204 |
| 2020/0374881 A1 | 11/2020 | Kwak et al. | |
| 2021/0058189 A1* | 2/2021 | Xiao | H04L 5/0053 |
| 2021/0307039 A1 | 9/2021 | Bae et al. | |
| 2022/0240187 A1* | 7/2022 | Guo | H04W 72/044 |

FOREIGN PATENT DOCUMENTS

| | | |
|---|---|---|
| WO | WO-201814338 A1 | 8/2018 |
| WO | WO-2019031911 A1 | 2/2019 |
| WO | WO-2019080817 A1 | 5/2019 |

OTHER PUBLICATIONS

Intel Corporation: "Cross-carrier Scheduling with Different Numerologies," 3GPP Draft, 3GPP TSG-RAN WG1 #96bis, R1-1904326, 3rd Generation Partnership Project (3GPP), Mobile Competence Centre, 650, Route Des Lucioles, F-06921, Sophia-Antipolis Cedex, France, vol. RAN WG1, No. Xian, China; Apr. 8, 2019-Apr. 12, 2019, Mar. 30, 2019 (Mar. 30, 2019), XP051691430, 3 pages, Retrieved from the Internet: URL: http://www.3gpp.org/ftp/tsg%5Fran/WG1%5FRL1/TSGR1%5F96b/Docs/R1%2D1904326%2Ezip, [retrieved on Mar. 30, 2019], figures 1-2, sections 2.1-2.2.

International Preliminary Report on Patentability—PCT/US2020/020624, The International Bureau of WIPO—Geneva, Switzerland, dated Nov. 8, 2021.

International Search Report and Written Opinion—PCT/US2020/020624—ISA/EPO—dated Jun. 24, 2020.

OPPO: "On Cross-Carrier Scheduling with Different Numerologies," 3GPP Draft, R1-1902709, 3GPP TSG RAN WG1 #96, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 25, 2019-Mar. 1, 2019, Feb. 15, 2019 (Feb. 15, 2019), XP051600404, 5 pages, Retrieved from the Internet: URL: http://www.3gpp.org/ftp/tsg%5Fran/WG1%5FRL1/TSGR1%5F96/Docs/R1%2D1902709%2Ezip [retrieved on Feb. 15, 2019], figures 1-3, sections 2-4.

Qualcomm Incorporated: "L1 Enhancements foreURLLC," 3GPP Draft, 3GPP TSG-RAN WG1 #94, R1-1809457, L1 Enhancements For EURLLC, 3rd Generation Partnership Project (3GPP), Mobile Competence Centre, 650, Route Des Lucioles, F-06921, Sophia-Antipolis Cedex, France, vol. RAN WG1, No. Gothenburg, Sweden, Aug. 20, 2018-Aug. 24, 2018, Aug. 17, 2018 (Aug. 17, 2018), XP051516822, 12 pages, Retrieved from the Internet: URL: http://www.3gpp.org/ftp/tsg%5Fran/WG1%5FRL1/TSGR1%5F94/Docs/R1%2D1809457%2Ezip [retrieved on Aug. 17, 2018] 3 Downlink Enhancements: Enhanced PDCCH monitoring for mini-slot level scheduling 6 Reduced Processing Timeline for Stringent URLLC Latency Requirement, section 3.

CATT: "Discussion on Cross-Carrier Scheduling with Different Numerologies", 3GPP TSG RAN WG1 Meeting #96bis, R1-1904545, Xi'an, China, Apr. 8-12, 2019, 7 Pages.

* cited by examiner

DOWNLINK CONTROL INDICATOR DISTRIBUTION FOR CROSS CARRIER SCHEDULING

CROSS REFERENCES

This present application for patent is a Continuation of U.S. patent application Ser. No. 16/805,435 by XU et al., entitled "DOWNLINK CONTROL INDICATOR DISTRIBUTION FOR CROSS CARRIER SCHEDULING" filed Feb. 28, 2020, which claims priority to U.S. Provisional Patent Application No. 62/843,235 by XU et al., entitled "DOWNLINK CONTROL INDICATOR DISTRIBUTION FOR CROSS CARRIER SCHEDULING" filed May 3, 2019, and to U.S. Provisional Patent Application No. 62/849,761 by XU et al., entitled "DOWNLINK CONTROL INDICATOR DISTRIBUTION FOR CROSS CARRIER SCHEDULING" filed May 17, 2019, assigned to the assignee hereof and expressly incorporated by reference in its entirety herein.

TECHNICAL FIELD

The technology discussed herein relates generally to wireless communication systems, and more particularly to the provision and use of downlink control indicator (DCI) distribution for cross carrier scheduling in a wireless communication system.

INTRODUCTION

In wireless communication systems that utilize carrier aggregation (CA) with cross carrier scheduling, a cell known as a scheduling cell may schedule a number of other cells, known as scheduled cells. Typically, up to eight (8) cells may be scheduled by a scheduling cell. In these systems, the subcarrier spacing (SCS) (i.e., frequency spacing between subcarrier frequencies in a symbol) of the scheduling cell transmissions may be different from the SCS of the scheduled cell transmissions. For example, the scheduling cell might have an SCS of 15 kHz, whereas all of the scheduled cells might have an SCS of 120 kHz. Downlink control indicators (DCIs) within the physical downlink control channel (PDCCH), which are used for downlink (DL) reception and uplink (UL) transmission by the scheduled cells, are decoded from the PDCCH transmissions from the scheduling cell in cross carrier scheduling systems. In cases of SCS disparity, however, the subcarrier spacing difference may decrease the ability of a user equipment (UE) to timely decode the PDCCH and the subsequent user data traffic in a physical downlink shared channel (PDSCH) before having to transmit a requisite acknowledgement/negative-acknowledgment (ACK/NACK) report at a specified time on the uplink channels.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

According to an aspect of the disclosure, a method of wireless communication is disclosed including generating at least one slot in a control channel from a first cell. The at least one slot includes a plurality of control channel segments arranged at respective times within the slot, wherein each of the control channel segments includes control information corresponding to respective slots for one or more second cells. Additionally, the method includes transmitting the at least one slot to one or more UEs to be used by the one or more UEs to determine the control information.

In yet another aspect, an apparatus for wireless communication is disclosed that includes at least one processor, a transceiver communicatively coupled to the at least one processor, and a memory communicatively coupled to the at least one processor. The at least one processor is configured to generate a transmission including at least one slot in a control channel from a first cell, the at least one slot including a plurality of control channel segments arranged at respective times within the slot, wherein each of the control channel segments includes control information corresponding to respective slots in a traffic channel for one or more second cells.

According to still another aspect, a method of wireless communication is disclosed including receiving in a user equipment (UE) in a scheduled cell from a scheduling cell at least one slot including a plurality of control channel segments arranged at respective times within the slot. Each of the control channel segments includes control information corresponding to respective slots in a traffic channel for the scheduled cell. Furthermore, the method includes decoding the at least one slot to determine the control information.

In yet another aspect, an apparatus for wireless communication is disclosed, where the apparatus includes at least one processor, a transceiver communicatively coupled to the at least one processor, and a memory communicatively coupled to the at least one processor. The at least one processor is configured to receive a transmission including at least one slot in a control channel from a scheduling cell, the at least one slot including a plurality of control channel segments arranged at respective times within the slot, wherein each of the control channel segments includes control information corresponding to respective slots in a traffic channel for one or more scheduled cells. Additionally, the processor is configured to decode the at least one slot to determine the control information.

These and other aspects of the present disclosure will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
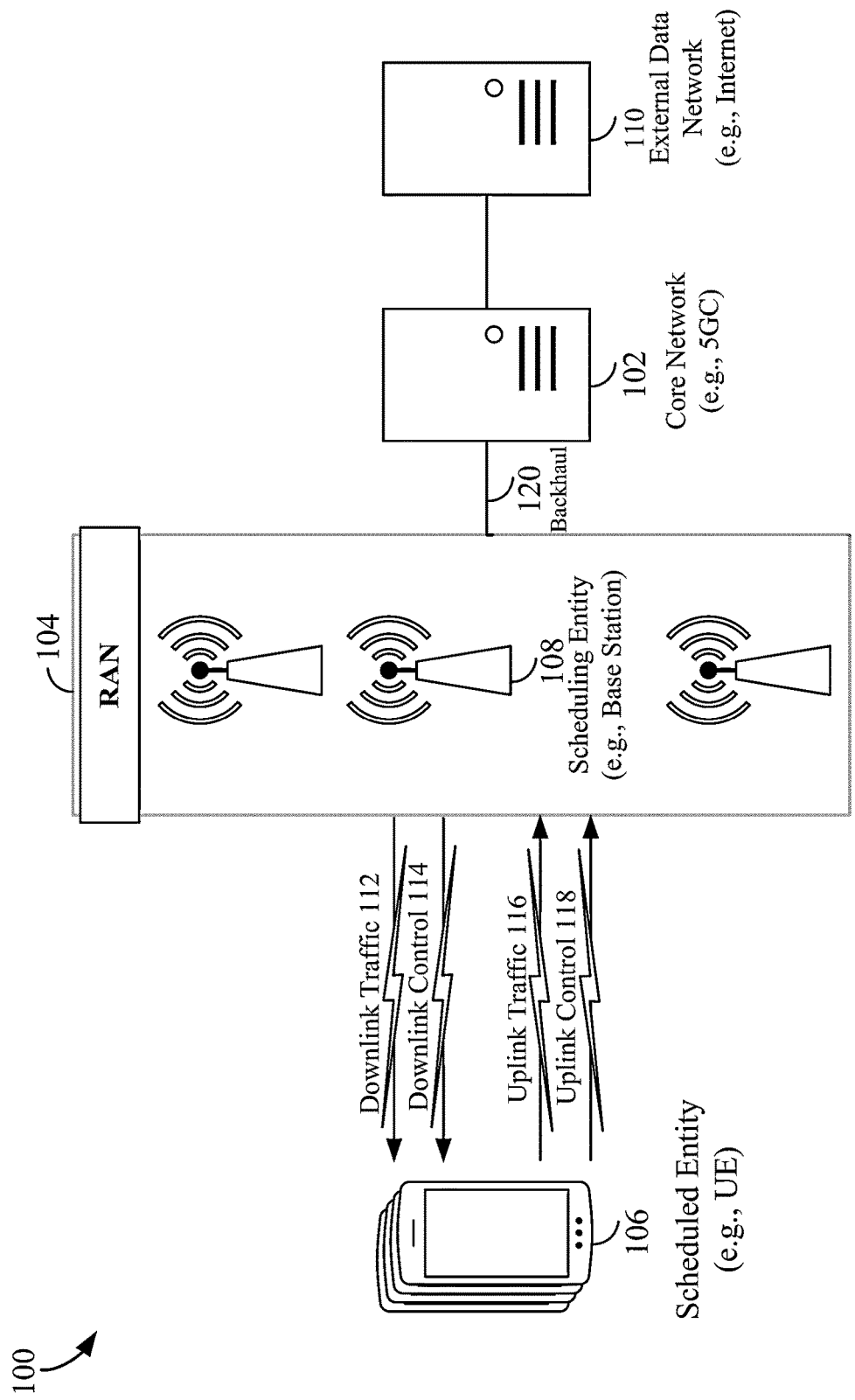
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

As discussed above, for wireless communication systems that utilize carrier with cross carrier scheduling where transmissions for the scheduling cell have an SCS that is different from transmissions for the scheduled cells, the subcarrier spacing difference may decrease the ability of a user equipment (UE) or mobile station (MS) to timely decode the PDCCH and the subsequent user data traffic in the PDSCH. In particular, this impairment arises because all DCIs for all slots of the scheduled cell that overlap with a slot of the scheduling cell are normally transmitted in the same time span, as will be discussed more fully later with respect to FIG. 4. In this case, a UE will need to finish the PDCCH decoding, as well as DCI pruning and parsing, fast enough so that the UE can buffer and finish PDSCH decoding before the requisite time for a UL transmission of the ACK/NACK report.

Accordingly, it would be beneficial to provide a scheduling slot from the scheduling entity where the PDCCH is divided into multiple spans of time within the scheduling slot in order to distribute the control information (e.g., DCIs) in time (and frequency) over a scheduling cell's slot. This scheduling may engender an increased number of DCIs per slot when the maximum number of DCIs in each span is constrained, especially in the cases where a lower SCS cell is scheduling a higher SCS cell. In this manner, the scheduled entities (i.e., UEs) may be able to more quickly obtain DCIs to begin PDSCH decoding, thus mitigating the possibility of improper or incomplete PDSCH decoding. Various methods and apparatus for implementing a multiple time span PDCCH to distribute DCIs for quicker decoding are disclosed herein.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
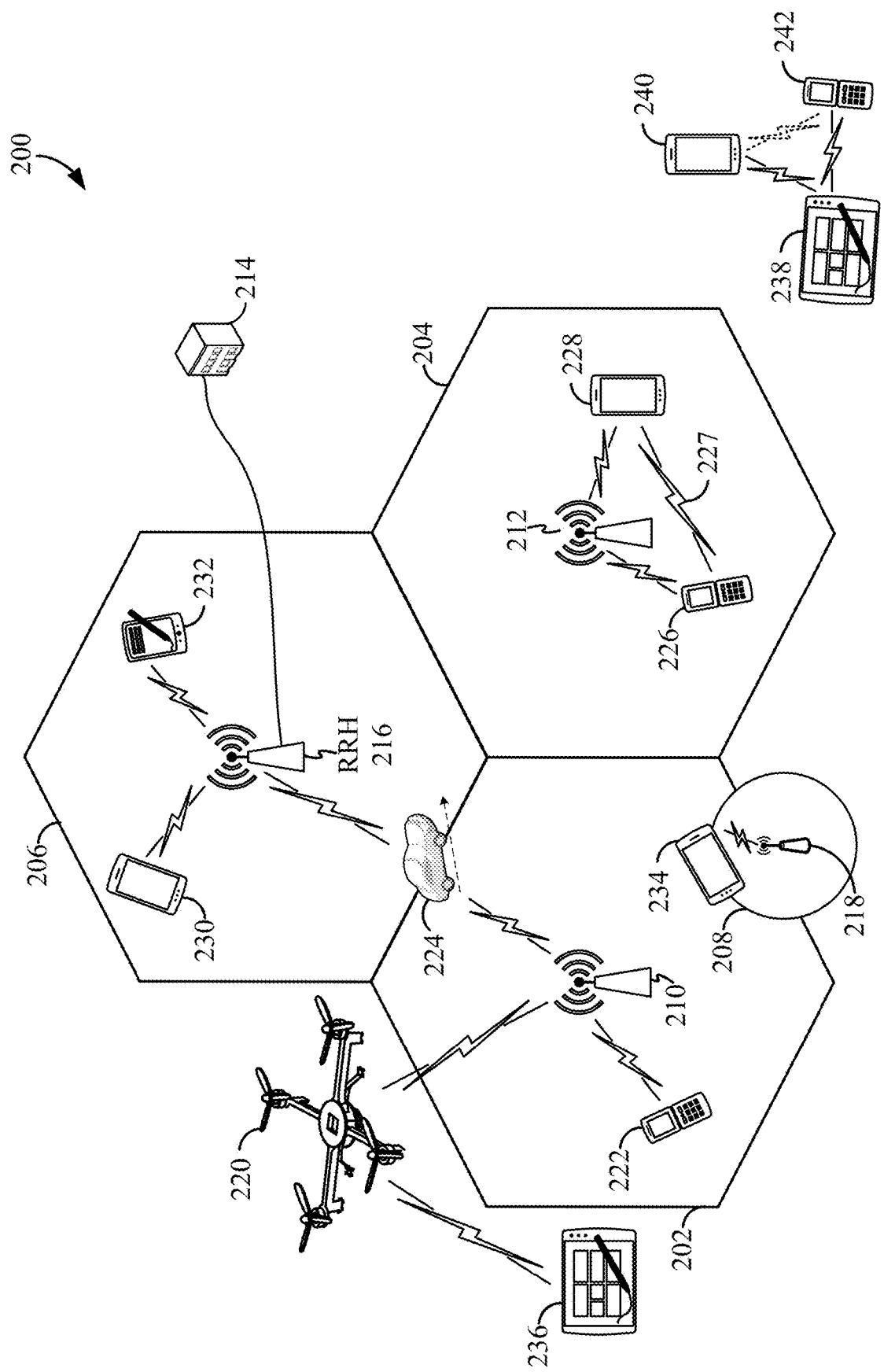
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

As referred to within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE. In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., the PDCCH), and the data region 314 may carry data channels (e.g., PDSCH or PUSCH). Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Figure 3:
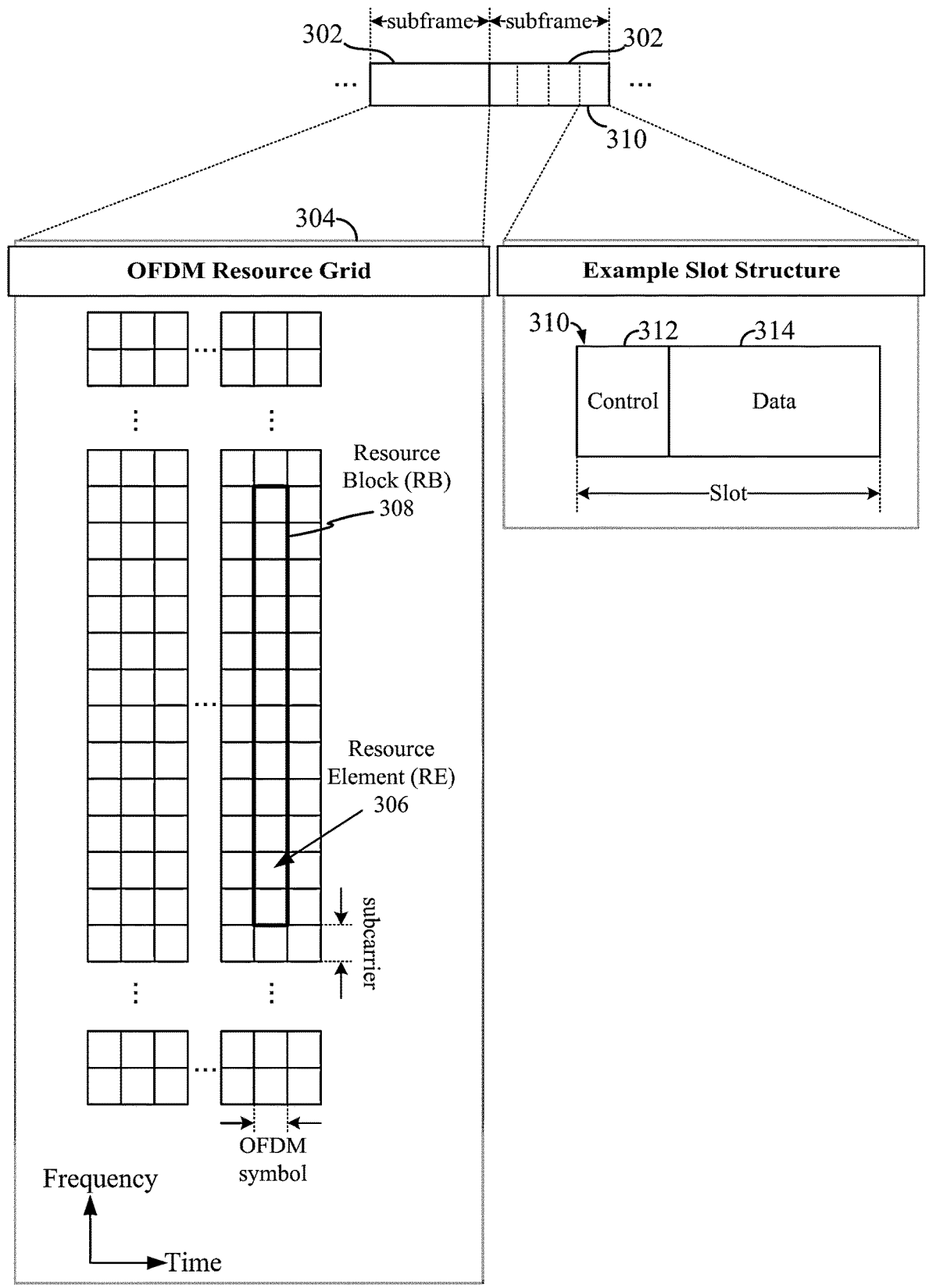
FIG. 3 illustrates an organization of wireless resources in an air interface utilizing orthogonal frequency divisional multiplexing (OFDM).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information 114 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative-acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 306 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

The channels or carriers described above and illustrated in FIGS. 1-3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 4:
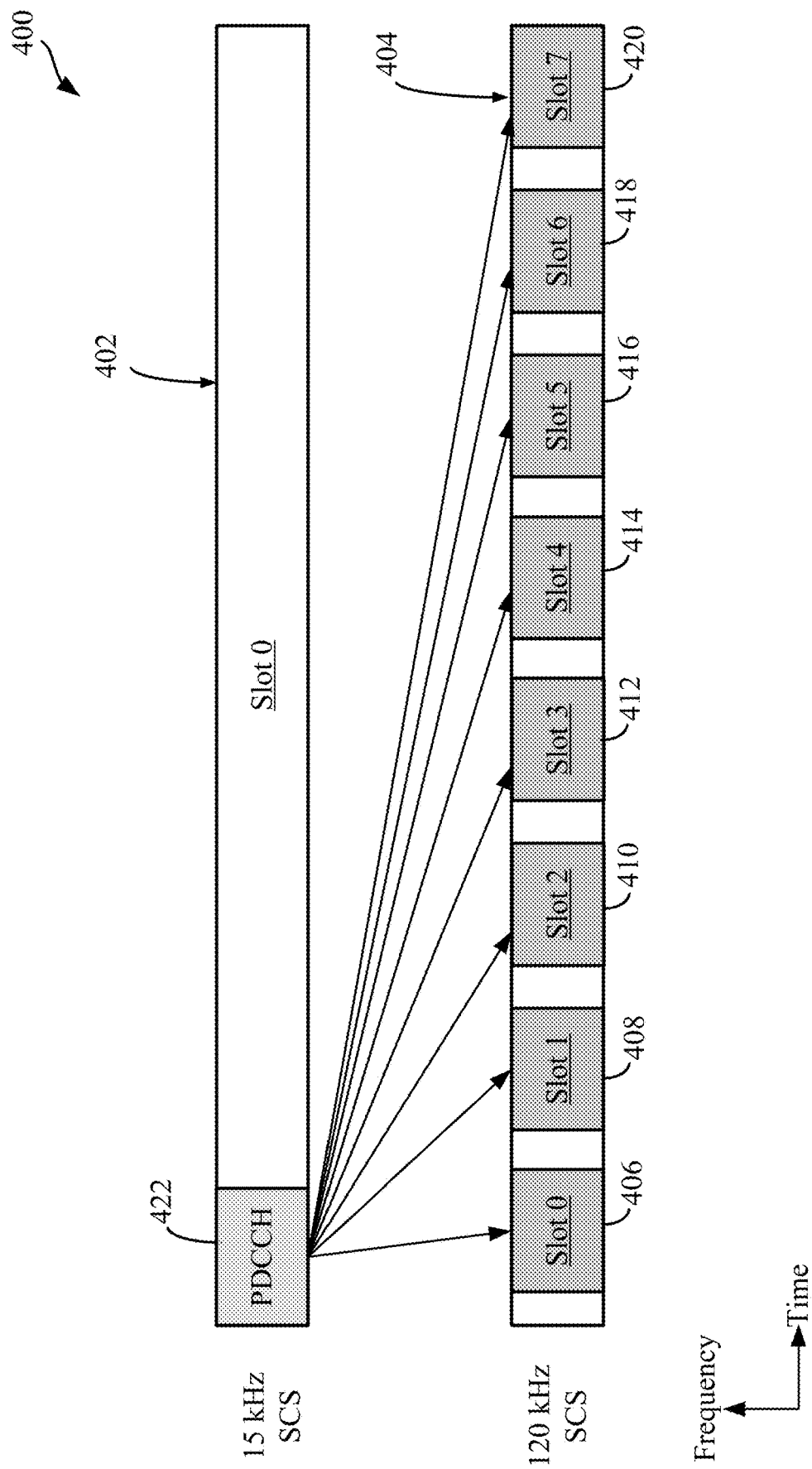
FIG. 4 illustrates an example of slot structures in a CA system using cross carrier scheduling with different SCS for the scheduling entities and scheduled entities.

Turning to specific examples of the present disclosure, FIG. 4 illustrates an example 400 of slot structures in a CA system using cross carrier scheduling with different SCSs for the respective scheduling entities and scheduled entities. In this example, a specified serving cell (e.g., a gNB, scheduling cell or scheduling entity, such as entity 108 in FIG. 1, or Primary Serving Cell (PSC)) schedules the resources for a number of other cells (i.e., scheduled cells or Secondary Serving Cells (SSCs)), which is typically up to 8 cells. In the illustrated example of FIG. 4, however, the scheduling cell is scheduling only one cell for simplicity of illustration.

Additionally, it is noted here that it is known that the SCS has an effect on the number of symbols, such as OFDM symbols, within a subframe. In particular, as SCS spacing gets wider or greater, the slot length will become shorter. In this example, it is assumed that the scheduling cell has an SCS of 15 kHz (i.e., spacing parameter $\mu=0$ in known spacing numerology where the SCS or frequency spacing Δf is determined by the equation Δf=$2^\mu$×15 kHz), which is typically the shortest used SCS spacing, and the scheduled cells utilize an SCS of 120 kHz (i.e., spacing parameter $\mu$=3 in known spacing numerology) for purposes of this example, but those skilled in the art will appreciate the present disclosure is applicable to any of a number of SCS spacings. In known systems, the 15 kHz SCS would result in a one (1) millisecond (ms) slot, such as slot 402, which could also constitute an entire 1 ms subframe. The 120 kHz SCS would result in 8 slots having a duration of 1 ms/8 or 0.125 ms in the 1 ms subframe as shown at 404, with slot 0 through slot 7 (i.e., reference numbers 406, 408, 410, 412, 414, 416, 418, and 420, respectively). These slots 406-420 represent eight PDSCH transmissions in a scheduled cell that are scheduled by the PDCCH in the scheduling cell (i.e., slot 402 of the scheduling cell). For typical wireless systems currently in 5G NR, the scenario shown in FIG. 4 would constitute a worst case scenario where the scheduling cell has an SCS of 15 kHz, and the scheduled cell has an SCS of 120 kHz. Of further note, in this example the single slot 402 of the scheduling cell overlaps in time with the eight (8) slots (406-420) of the scheduled cell when 15 kHz SCS and 120 kHz SCSs are respectively used for the two cells, but other SCS values will result in other numerologies and overlaps, such as one scheduling cell slot overlapping four slots of a scheduled cell in an example of 15 kHz SCS in the scheduling cell and 60 kHz SCS (i.e., $\mu$=2) in the scheduled cell.

For cross carrier scheduling, the scheduling cell includes the PDCCH 422 with downlink control indicators (DCIs) used by scheduled cells for DL reception and UL transmissions as well as other control information such as a slot format indicator, where the DCIs are decoded from the PDCCH 422 of the scheduling cell. The difference in the SCSs between the scheduling and scheduled cells imposes difficulties for UE decoding of the PDCCH 422. As may be seen in the figure, since the PDCCH 422 is typically at the beginning of the slot 0 402, there may be a significant delay and buffering that is experienced by a UE. Here, the DCIs for all slots of the scheduled cell are transmitted in the same PDCCH monitoring occasion, which results in a UE not being able to determine which DCI is designated for control information in which slot before the DCIs are decoded. For example, DCIs for the last slot of the scheduled cell (i.e., slot 7 (420) in FIG. 4) and DCIs for the first slot of the scheduled cell (slot 0 (406) in FIG. 4) are transmitted together in the same set of symbols in the scheduling cell. The UE may decode the DCI for the last slot before it decodes the DCI for the first slot. As a result, there may be a large timing delay for the UE to be able to decode a PDSCH transmitted in the first slot (i.e., slot 1 after slot 0). Accordingly, this arrangement presents timing problems, especially since a UE needs to finish the PDCCH decoding and DCI pruning and parsing quickly enough to then allow the UE to finish decoding the subsequent Physical Downlink Shared Channel PDSCH before the time UL transmission time for ACK/NACK report. These resultant timing problems may lead to unnecessary NACK reports and further delays.

Figure 5:
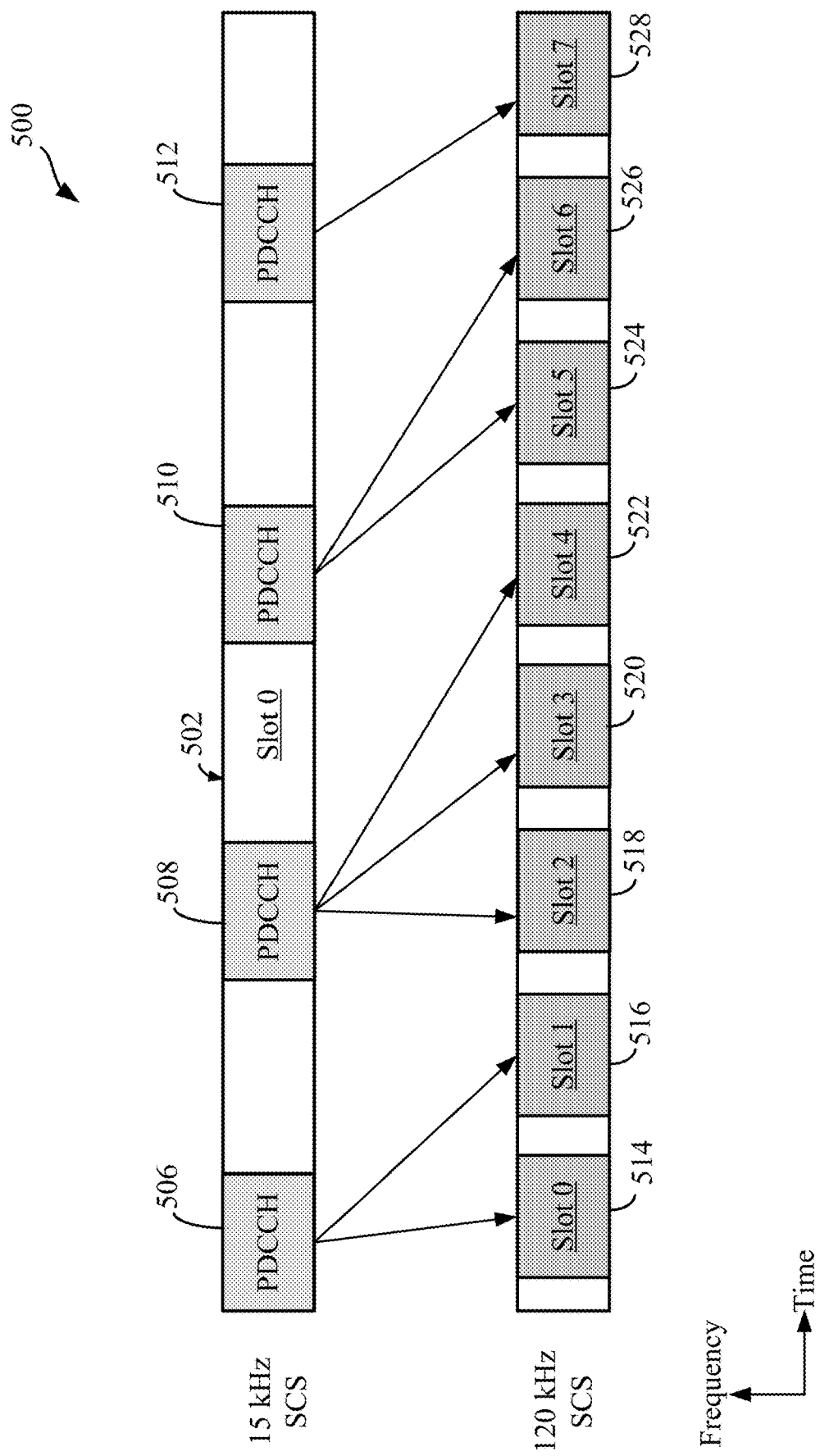
FIG. 5 illustrates an example of utilizing multiple spans of a control channel in a slot of a scheduling cell or entity according to aspects of the present disclosure.

In light of the encoding difficulties arising from the use of different SCSs for the scheduling cell and scheduled cells in the example of FIG. 4, FIG. 5 illustrates an example 500 of utilizing multiple spans of a control channel in a slot of a scheduling cell or entity according to aspects of the present disclosure. As shown in this example, the PDCCH in a slot 0 (shown by reference number 502) of the scheduling cell may be configured as transmissions of a PDCCH that is transmitted across multiple control channel segments or spans within the slot 502 (e.g., the control channel segments or spans of the PDCHH are arranged at various respective times in the slot 502). Accordingly, the PDCCH may be positioned to more closely align in time to respective slots in the scheduled cell in order to mitigate timing problems and delays. In this example, four segments or spans 506, 508, 510, and 512 of the PDCCH are illustrated occurring or arranged at various different times within the slot 502, but it is noted that the disclosure is not limited to such numbers and the present disclosure contemplates PDCCHs transmitted across at least two or more segments. Of further note, for purposes of the present disclosure, it is noted that a span or segment may be considered a number of consecutive OFDM symbols in a slot where PDCCHs are monitored. Thus, a span will occur within a single slot, i.e., the span does not cross a slot boundary. In a further aspect, spans may be counted from the beginning of a slot. Additionally, a transmission of a PDCCH does not cross or is not split between two spans. In yet another particular aspect, it is noted that the number of consecutive OFDM symbols of a span or segment may be limited to a number such 3 (or less) OFDM symbols for certain implementations, but the disclosure is not limited to such.

Further, it is noted that the segments 506, 508, 510, or 512 may be configured to group together particular control information in corresponding to various respective slots 0 through 7 (i.e., reference numbers 514 through 528) of the scheduled cells. For example, segment 506 of the PDCCH may contain control information and/or grants for resources in slots 0 and 1 (514, 516), segment 508 of the PDCCH may contain control information and/or grants for resources in slots 2, 3, and 4 (518, 520, and 522), and so forth. The grouping of such control information and/or resource grants in the PDCCH segments (506-512) to be more closely aligned in time with the relevant slots in the scheduled cell to which that information or grants pertain, achieves an improvement in decoding timing in the UEs. Of note here, the control information in the PDCCH segments 506-512 may include one or more of grants for the physical downlink shared channel (PDSCH) or the physical uplink shared channel (PUSCH), DCIs, or slot format indications, as examples, but is not limited to such.

In other aspects, while the example of FIG. 5 has been described as configuring the segments or spans 506-512 as containing respective groupings of relevant control information, it is noted that each of segments 506-512 may instead contain identical, repeated information of the PDCCH. In this case, the UEs serviced in the scheduled cells may be preconfigured to monitor particular segments of segments 506-512, whose timings may be known to the UE, in order gain the relevant control information for decoding.

In still further aspects, it is noted that provision of multiple spans in the example of FIG. 5 (as well as FIGS. 6-8 to be discussed below), may include setting a predetermined maximum number or limit of DCIs that a UE is expected to decode. In a particular alternative, the maximum number of unicast DCIs that a UE is expected to decode in each span of PDCCH symbols may be defined (e.g., PDCCH span or segment 506 containing two DCIs for two PDSCH slots 514 and 516, or PDCCH span or segment 508 containing three DCIs for three PDSCH slots 518, 520, and 522). This maximum number could be determined a priori for a given system, or may be contained within each of the control channel segments or spans (506-512) for DCIs for each of the scheduled cells or for all of the scheduled cells. In aspects, the predetermined maximum number may be determined based on the combination of a subcarrier spacing (SCS) of the control channel of the scheduling cell and the SCS of at least one of the scheduled cells. In another alternative, the predetermined maximum number may be determined based on the subcarrier spacing (SCS) of the control channel of the scheduling cell and cover all possible cases of the scheduled cell SCSs. Additionally, in a further aspect, the DCIs are unicast DCIs where each DCI constitutes transmission of control information from the scheduling cell to a particular scheduled cell.

Figure 6:
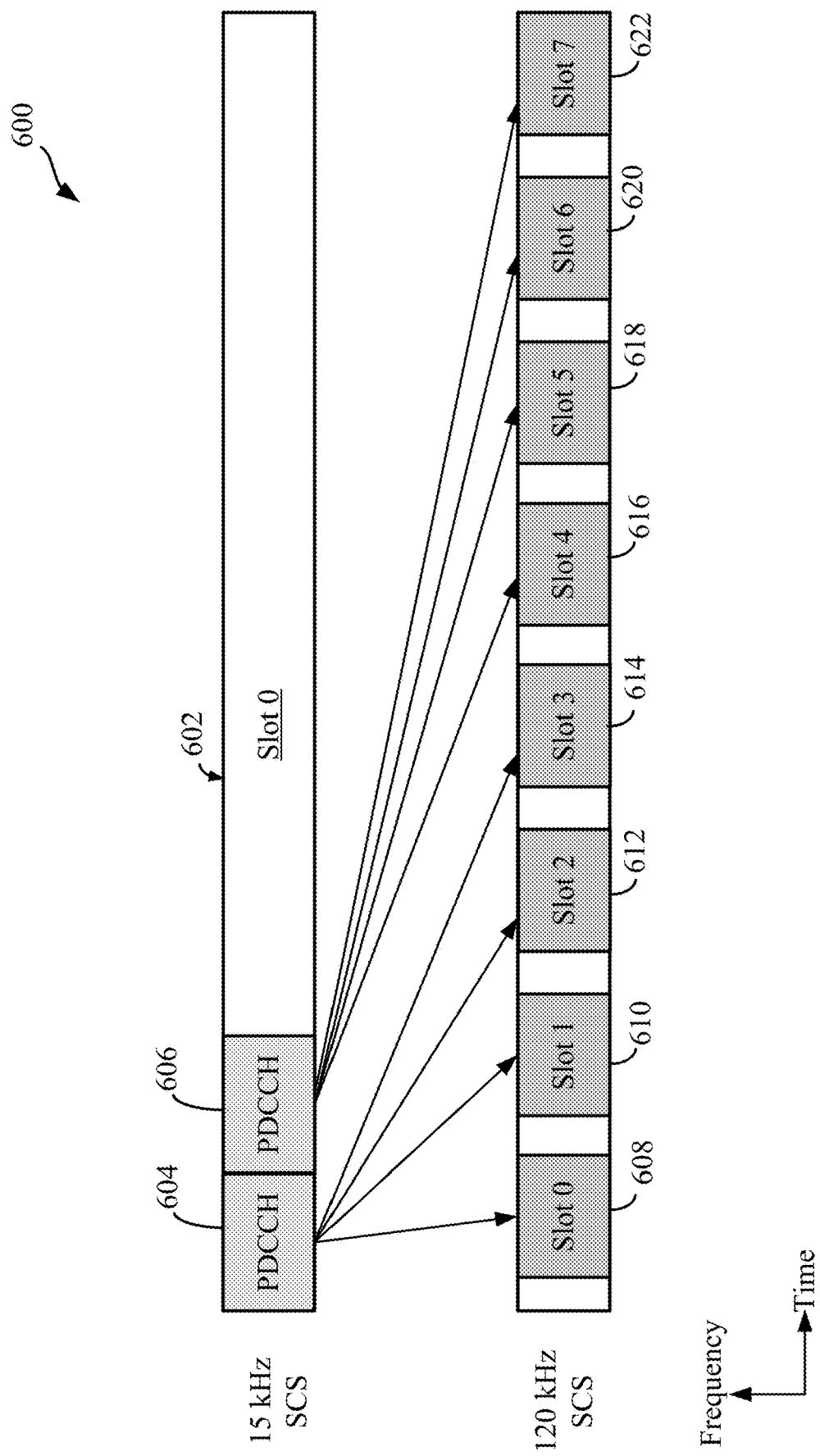
FIG. 6 illustrates another example of utilizing multiple spans of a control channel in a slot of a scheduling cell or entity according to aspects of the present disclosure.

Furthermore, while the example of FIG. 5 illustrates spacing of the control segments 506-512 at various times over the slot 502, in other embodiments, the control segments may be arranged more closely together, as well as at the beginning of the scheduling cell's slot. Accordingly, FIG. 6 illustrates another example 600 of utilizing multiple segment or spans of a control channel PDCCH in a slot 602 of a scheduling cell or entity according to aspects of the present disclosure. In this example, two segments or spans 604 and 606 are utilized and are positioned adjacent or immediately consecutive in time to one another (e.g., immediately successive spans). As further shown, the first segment 604 may be configured to contain a portion of the PDCCH and the associated control information and/or grants that pertain to slots 0-3 (i.e., slots 608-614) of the scheduled cell, which has a greater SCS than the scheduling cell. Additionally, the second segment or span 605 contains that portion of the PDCCH with associated control information and/or grants pertaining to slots 4-7 (i.e., slots 616-622) of the scheduled cell.

Figure 7:
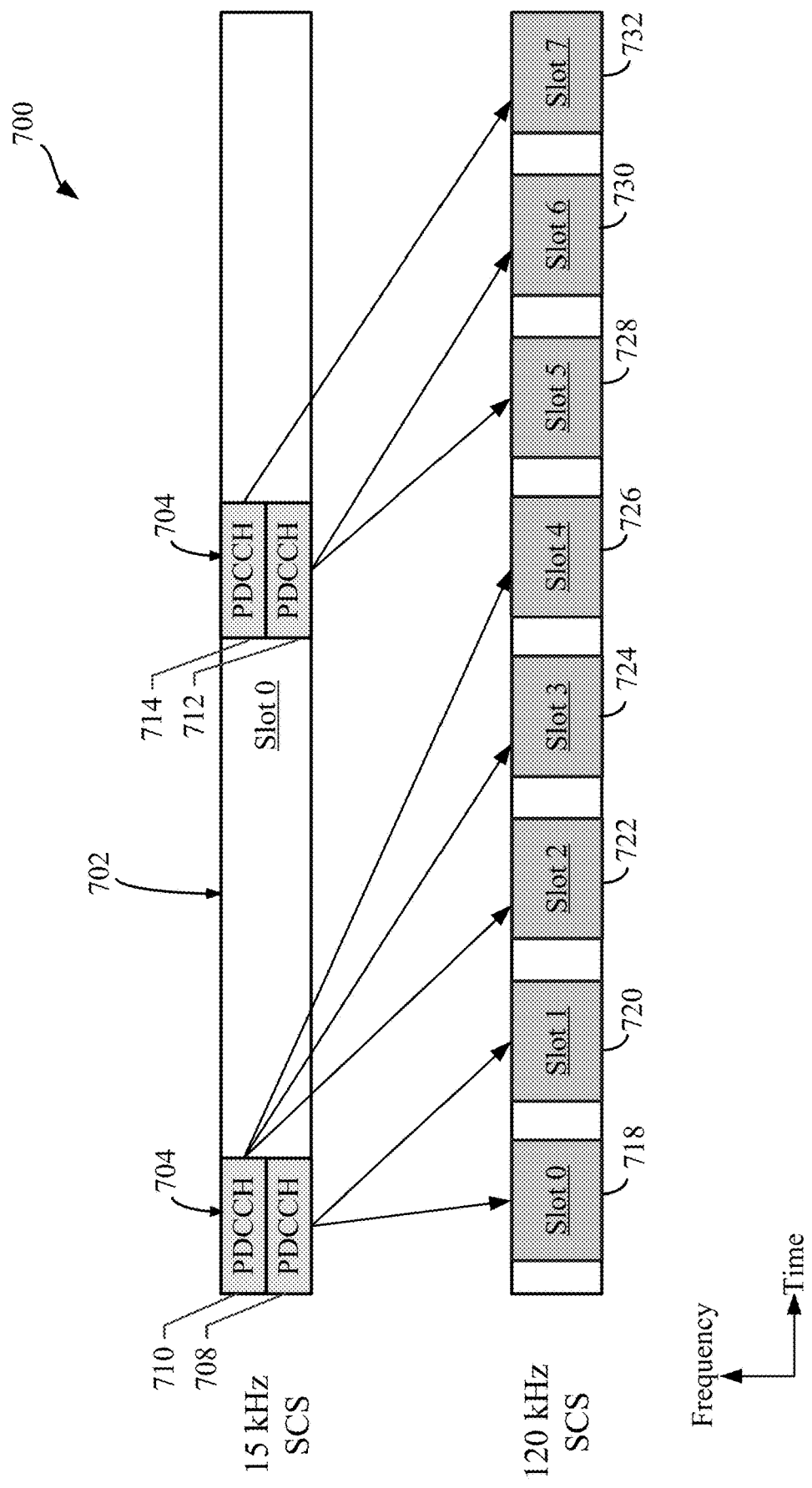
FIG. 7 illustrates an example of utilizing multiple spans and frequencies for a control channel in a slot of a scheduling cell or entity according to aspects of the present disclosure.

FIG. 7 illustrates yet another example 700 of utilizing multiple segments or spans for a control channel in a slot of a scheduling cell or entity, with the added feature of segmenting or sub-dividing each segment or span into further groupings according to frequency. As illustrated, the slot 0 702 of the scheduling cell includes two time segments or spans 704 and 706 of the PDCCH, with each of these spans further sub-divided by frequency into further separate segments at shown by reference numbers 708, 710, 712, and 714. Accordingly, each of segments 708, 710, 712, and 714 may contain a respective grouping of control information or grants that pertain to respective slots. For example, segment 708 may contain that portion of the PDCCH pertaining to slots 0 and 1 (718, 720), segment 710 may contain information pertaining to slots 2-4 (722, 724, and 726), segment 712 may contain information pertaining to slots 5 and 6 (728, 730), and segment 714 may contain information pertaining to slot 7 (732).

Figure 8:
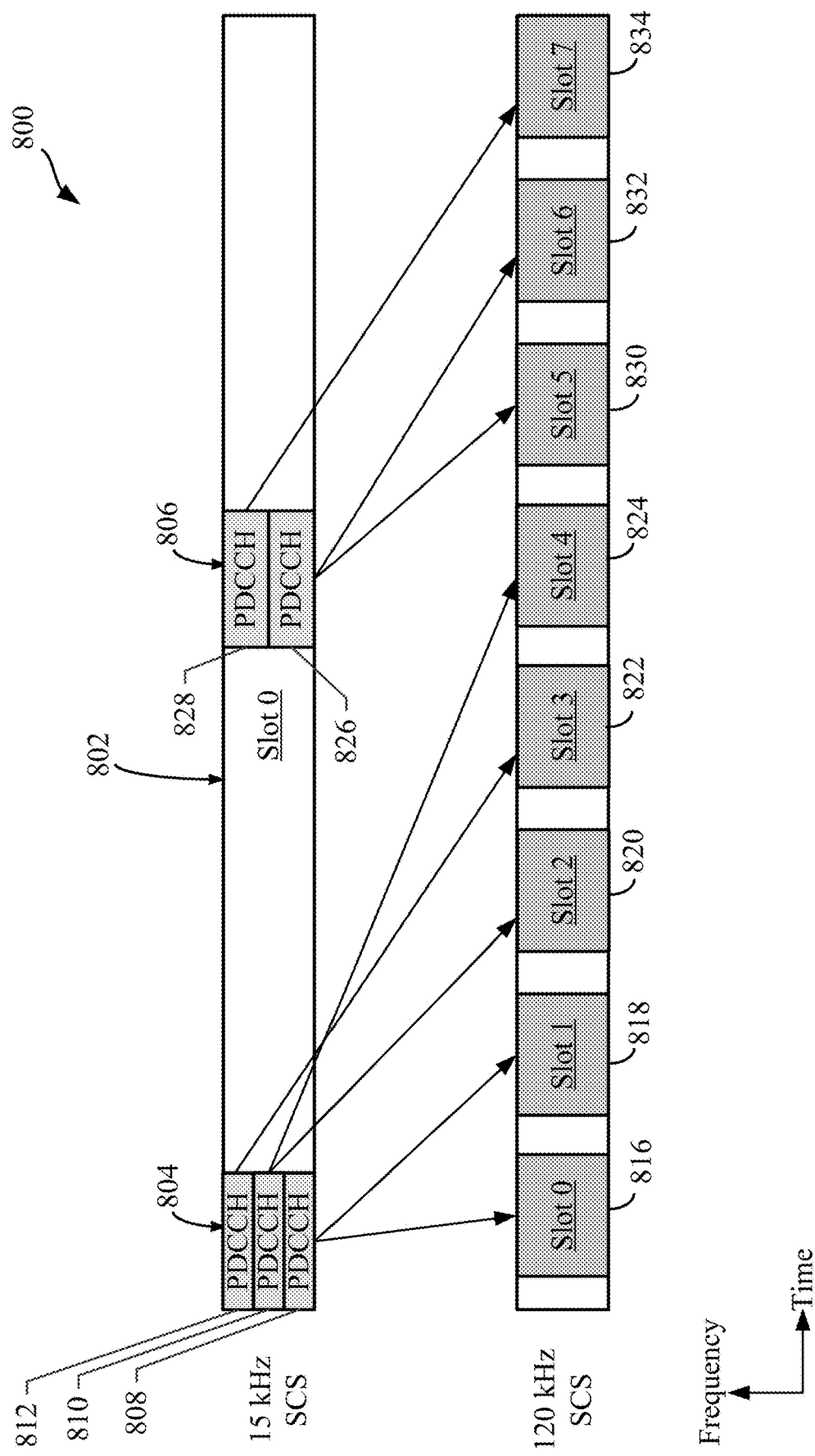
FIG. 8 illustrates another example of utilizing multiple spans and frequencies for a control channel in a slot of a scheduling cell or entity according to aspects of the present disclosure.

FIG. 8 illustrates another example 800 of utilizing multiple spans and frequencies for a control channel in a slot of a scheduling cell or entity according to aspects of the present disclosure. Similar to the example of FIG. 7, the scheduling cell slot 0 (802) contains includes two time segments or spans 804 and 806 of the PDCCH, which are further sub-divided by frequency into further separate segments. In this example, one of segments 804 may be subdivided into three segments by frequency as indicated by reference numbers 808, 810, and 812. Again, each of these frequency divided segments 808, 810, and 812 may contain a respective grouping of control information or grants that pertain to respective slots. In this example, segment 808 may contain that portion of the PDCCH pertaining to slots 0 and 1 (816 and 818). Segment 810 may contain information pertaining to slots 2 and 4 (820 and 824), which are not necessarily sequential in time as there is an intervening slot 3 822. Segment 812 may contain information pertaining to slot 3 822. The segments at 806 (i.e., frequency divided segments 826 and 828 occurring during the time of segment 806) are mapped similar to slots 5-7 (i.e., segment 826 is mapped to slots 5 and 6 (reference numbers 826 and 828), and segment 828 is mapped to slot 7 (reference number 830)) as shown in the example of FIG. 7, further showing that each segment 804 and 806 need not necessarily contain the same number of subdivided frequency segments.

As discussed above in connection with FIG. 5, a maximum number or limit of DCIs may be defined for the UE to detect in each span, but this concept is applicable to the schemes of FIGS. 6-8 as well. This limit setting for these scenarios includes the above-discussed various permutations such as defining a limit or maximum number of DCIs for each scheduled cell, defining a limit or maximum number of DCI's for all scheduled cells, defining the limit or maximum DCI's for all combinations of a scheduling cell and all scheduled cell subcarrier spacings (SCSs), or a limit or maximum number for each scheduling cell's SCS and all possible cases of the scheduled cells' SCSs.

According to further aspects, the maximum number or limit may be defined for DCIs that a network or scheduling cell sends for the UE to detect. The DCIs may include all types of DCIs that the UE may support or, alternatively, a subset of the types of DCIs that the UE supports. Examples of such types of DCIs may include DCIs for unicast transmission, DCIs for SPS (semi-persistent scheduling) activation/deactivation, DCIs for broadcast transmission, DCIs for random access and paging, DCIs for system information transmission, and group common DCIs. Still further examples related to unicast transmissions may include DCIs for UL and DL unicast transmissions, DCIs for DL unicast transmissions, and DCIs for UL unicast transmissions.

In still further aspects, it is noted that the limit or maximum number of DCIs may be determined or specified according to specific rules, conditions, or algorithms. It can be assumed that for each scheduled cell, the maximum number or limit of DCIs that a UE may be expected to decode may be defined as some fixed number N. According to certain examples, the limit N can be 8 or 16, which allows the provision of at least 1 or 2 unicast DCIs, respectively, for each slot of the scheduled cell in the case of a 15 kHz SCS cell scheduling a 120 kHz SCS scheduled cell.

Of yet further note, when a number of scheduled cells K is larger than one (1), if the number of scheduled cells K is less than or equal to a number L (K≤L), the maximum number of DCIs that a UE can be expected to decode for all scheduled cells will be K·N. If a number of scheduled cells K is greater than L, the maximum number of DCIs that the UE could be expected to decode for all scheduled cells will be L·N. According to certain aspects, the number L can be set equal to a maximum of 4 and the PDCCH blind detection capability for CA (i.e., pdcch-BlindDetectionCA in RRC configuration signaling). It is also noted here that the value L is a predetermined value used to avoid the DCI limit being too large. Thus, before the number of scheduled cells is greater than or equal to L, the limit will increase linearly as the number of scheduled cells increases. After the number of scheduled cells is greater than L, the limit does not increase anymore.

Figure 9:
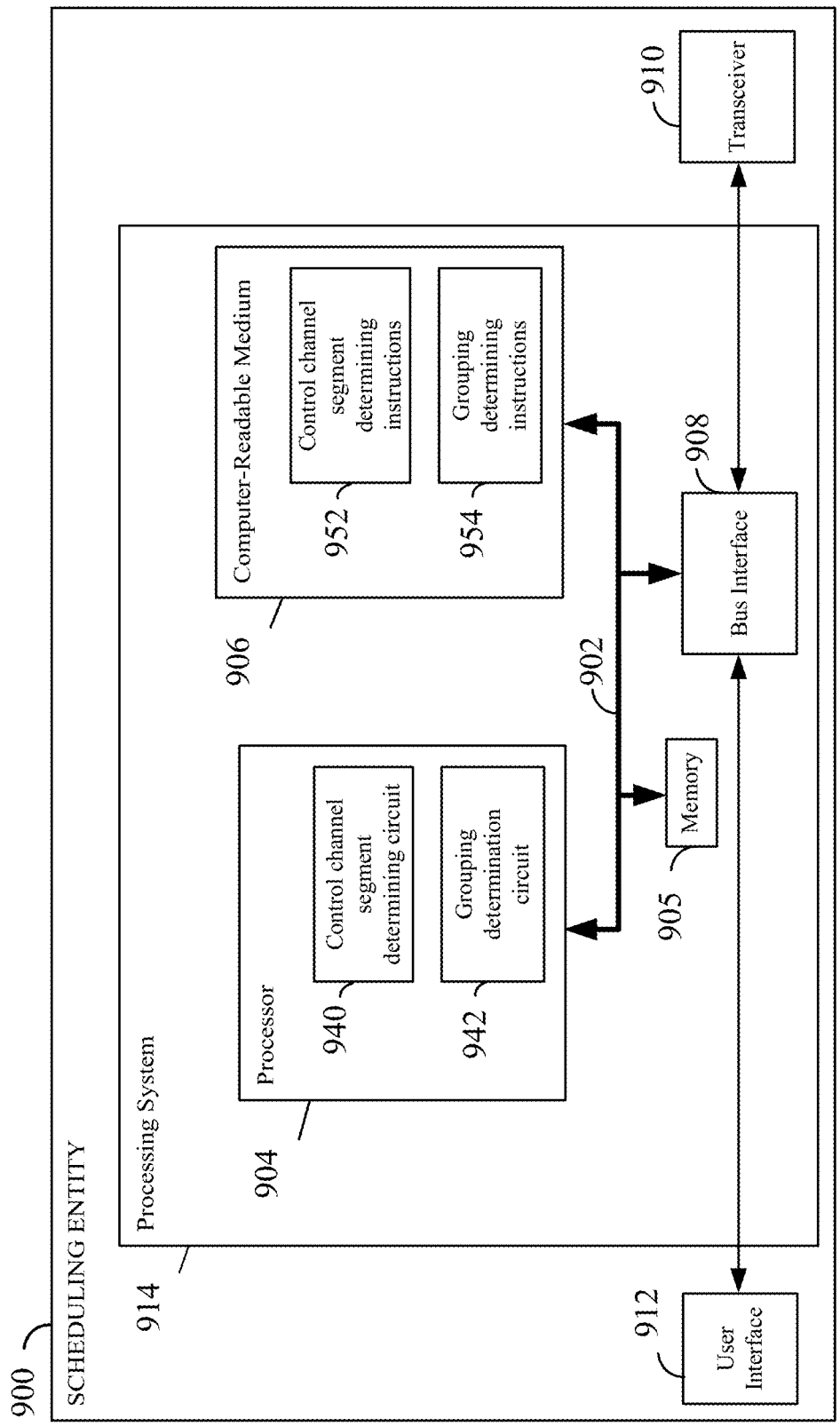
FIG. 9 is a block diagram illustrating an example of a hardware implementation for a scheduling entity apparatus employing a processing system.

FIG. 9 is a block diagram illustrating an example of a hardware implementation for a scheduling entity or base station 900 employing a processing system 914. For example, the scheduling entity 900 may be a user equipment (UE) as illustrated in any one or more of FIG. 1 or 2. In another example, the scheduling entity 900 may be a base station as illustrated in any one or more of FIGS. 1 and 2.

The scheduling entity 900 may be implemented with a processing system 914 that includes one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 900 may be configured to perform any one or more of the functions described herein. That is, the processor 904, as utilized in a scheduling entity 900, may be used to implement any one or more of the processes and procedures described below and illustrated in the flow diagram of FIG. 11, to be discussed later.

In this example, the processing system 914 may be implemented with a bus architecture, represented generally by the bus 902. The bus 902 may include any number of interconnecting buses and bridges depending on the specific application of the processing system 914 and the overall design constraints. The bus 902 communicatively couples together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further. A bus interface 908 provides an interface between the bus 902 and a transceiver 910. The transceiver 910 provides a communication interface or means for communicating with various other apparatus over a transmission medium. Depending upon the nature of the apparatus, a user interface 912 (e.g., keypad, display, speaker, microphone, joystick) may also be provided.

In some aspects of the disclosure, the processor 904 may include control segment determination circuitry 940 configured for various functions, including, for example, determining multiple control segments or spans to be transmitted in one or more slots by the scheduling entity 900, such as was described in connection with FIGS. 5 and 6. In a further example, the circuitry 940 is further configured to determine division of control segments or spans of a PDCCH according to frequency as was described in connection with FIGS. 7 and 8. In a further example, the control segment determination circuitry 940 may be configured to implement one or more of the functions described below in relation to the method illustrated in FIG. 11.

In some other aspects of the disclosure, the processor 904 may include grouping determination circuitry 942 configured for various functions, including, for example, grouping control information or grants for a PDCCH within particular control segments that align with or correspond to relevant slots for the scheduled cell, where the scheduled cell typically has a greater SCS value and a greater number of slots per unit time compared to the slots of the scheduling entity. Additionally, the grouping determination circuitry 942 may be configured to implement one or more of the functions described below in relation to the method of FIG. 11.

The processor 904 is responsible for managing the bus 902 and general processing, including the execution of software stored on the computer-readable medium 906. The software, when executed by the processor 904, causes the processing system 914 to perform the various functions described below for any particular apparatus. The computer-readable medium 906 and the memory 905 may also be used for storing data that is manipulated by the processor 904 when executing software.

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 906. The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 906 may reside in the processing system 914, external to the processing system 914, or distributed across multiple entities including the processing system 914. The computer-readable medium 906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 906 may include control channel segment determining software or instructions 952 configured for various functions, including, for example, determining control segments or spans as described in connection with FIGS. 5 and 6. In a further example, the software or instructions 952 are further configured to determine division of control segments or spans of a PDCCH according to frequency as was described in connection with FIGS. 7 and 8. In further examples, the medium 906 may include grouping determining software or instructions 954, including, for example, grouping control information or grants for a PDCCH within particular control segments that align with or correspond to relevant slots for the scheduled cell, where the scheduled cell typically has a greater SCS value and a greater number of slots per unit time compared to the number of slots of the scheduling entity Of course, in the above examples, the circuitry included in the processor 904 is merely provided as an example, and other means for carrying out the described functions may be included within various aspects of the present disclosure, including but not limited to the instructions stored in the computer-readable storage medium 1006, or any other suitable apparatus or means described in any one of the FIG. 1 or 2, and utilizing, for example, the processes and/or algorithms described herein in relation to FIGS. 5-8.

Figure 10:
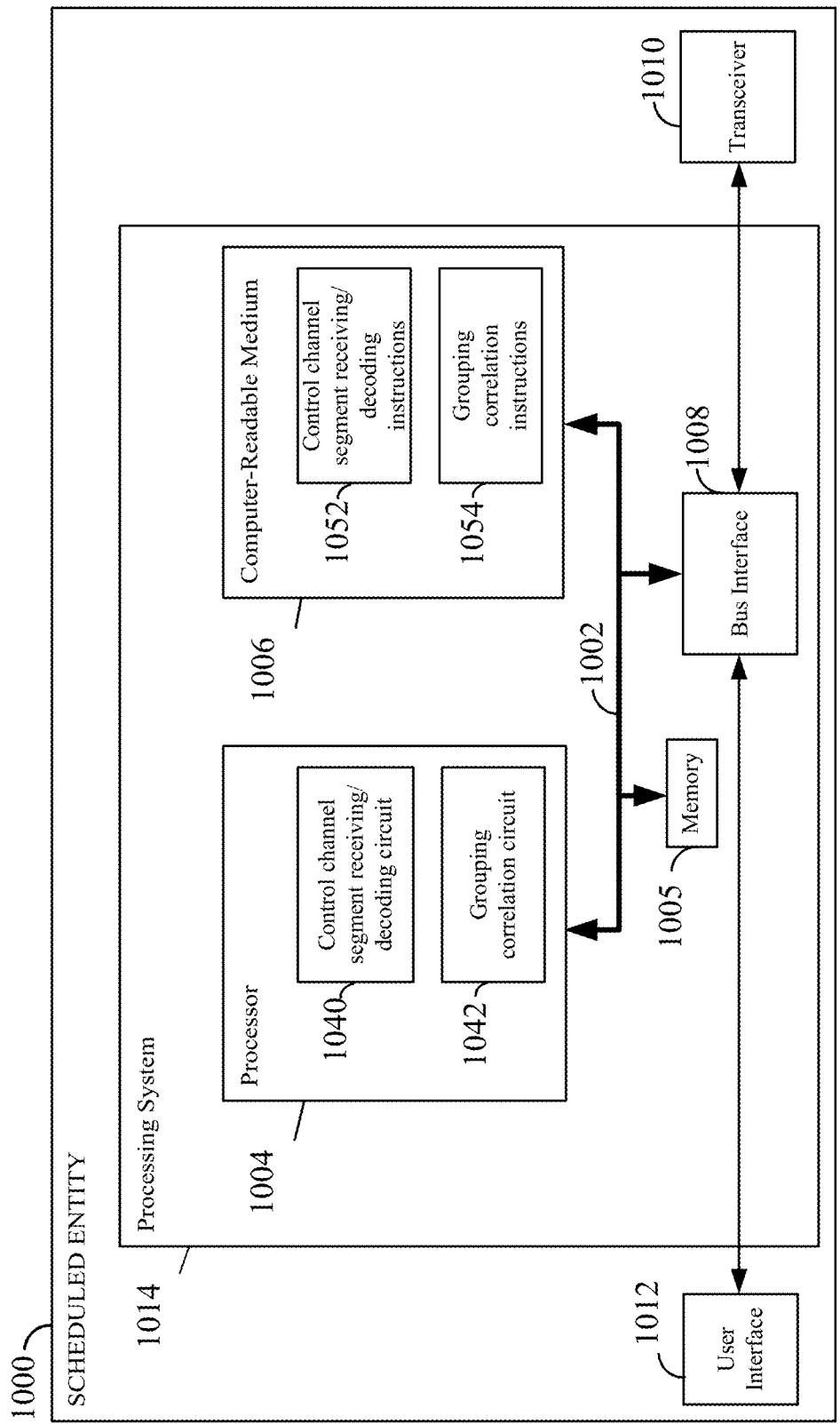
FIG. 10 is a block diagram illustrating an example of a hardware implementation for a scheduled entity apparatus employing a processing system.

FIG. 10 is a conceptual diagram illustrating an example of a hardware implementation for an exemplary scheduled entity or UE 1000 employing a processing system 1014. In accordance with various aspects of the disclosure, an element, or any portion of an element, or any combination of elements may be implemented with a processing system 1014 that includes one or more processors 1004. For example, the scheduled entity 1000 may be a user equipment (UE) as illustrated in any one or more of FIGS. 1 and 2.

The processing system 1014 may be substantially the same as the processing system 914 illustrated in FIG. 9, including a bus interface 1008, a bus 1002, memory 1005, a processor 1004, and a computer-readable medium 1006. Furthermore, the scheduled entity 1000 may include a user interface 1012 and a transceiver 1010 substantially similar to those described above in FIG. 10. That is, the processor 1004, as utilized in a scheduled entity or 1000, may be used to implement any one or more of the processes described below and illustrated in FIG. 12.

In some aspects of the disclosure, the processor 1004 may include control channel segment receiving and decoding circuit 1040 configured for various functions, including, for example, receiving the PDCCH control information in a PDCCH control segment or span received from the scheduling entity (e.g., 900) and initiate decoding of one or more of at least one grant for a physical downlink shared channel (PDSCH), a physical uplink shared channel (PUSCH), downlink control indicators (DCIs), or slot indicators that may be contained in at least one control segment. In another example, the circuitry 1040 may be configured to implement one or more of the functions described below in relation to the method illustrated in FIG. 12.

In some aspects of the disclosure, the processor 1004 may include a grouping correlation circuit 1042. For example, the circuitry 1042 may be configured to determine a relevant or predetermined control segment that contains control information grouped to align timing-wise with slots transmitted to the scheduled entity or entities. Additionally, circuitry 1042 may be configured to implement one or more of the functions described below in relation to FIG. 12, as discussed later herein.

Of course, in the above examples, the circuitry included in the processor 1004 is merely provided as an example, and other means for carrying out the described functions may be included within various aspects of the present disclosure, including but not limited to the instructions stored in the computer-readable storage medium 1006, or any other suitable apparatus or means described in any one of the FIG. 1 or 2, and utilizing, for example, the processes and/or algorithms described herein in relation to FIGS. 5-8. Instructions or software corresponding to the circuits 1040 and 1042 include instructions 1054, respectively.

Figure 11:
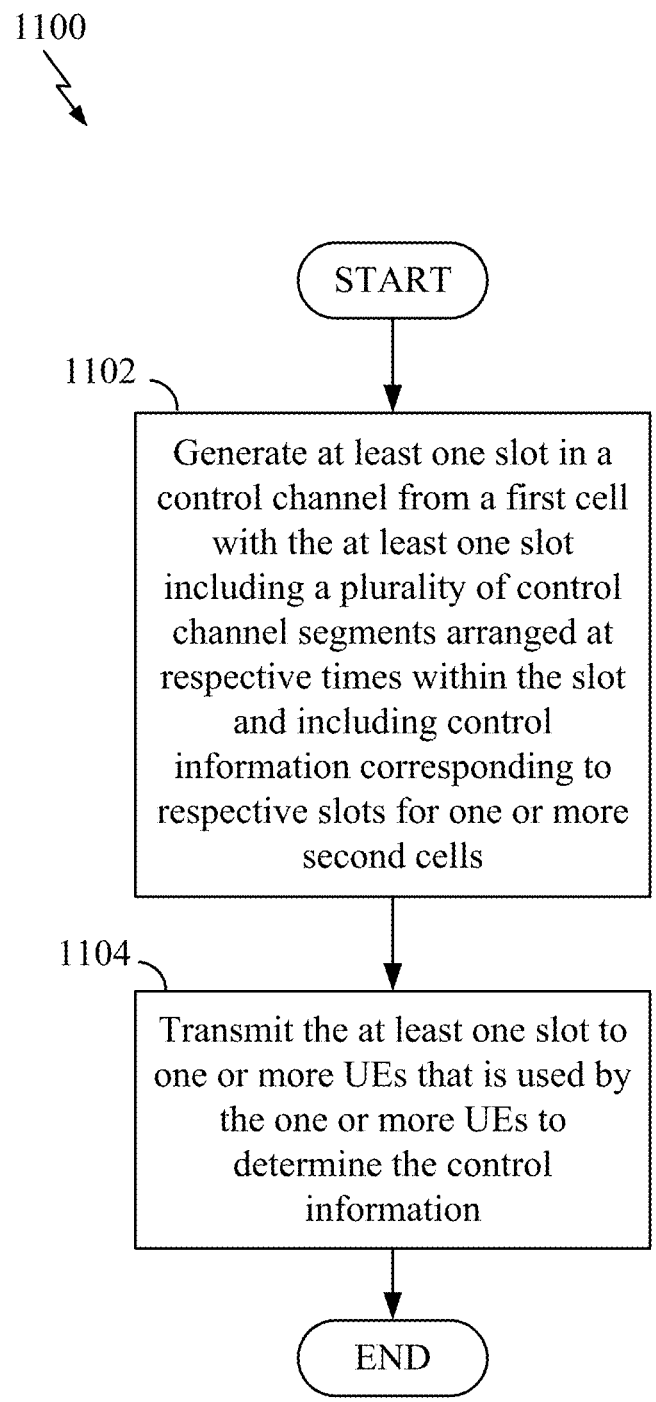
FIG. 11 is a flow diagram of an exemplary method for configuring transmissions in a wireless system according to exemplary aspects of the present disclosure.

FIG. 11 is a flow chart illustrating an exemplary method 1100 for wireless communication in accordance with some aspects of the present disclosure. As described below, some or all illustrated features may be omitted in a particular implementation within the scope of the present disclosure, and some illustrated features may not be required for implementation of all embodiments. In some examples, the method 1100 may be carried out by the scheduling entity 900 illustrated in FIG. 9. In some examples, the method 1100 may be carried out by any suitable apparatus or means for carrying out the functions or algorithm described below.

At block 1102, the method 1100 includes generating at least one slot in a control channel from a first cell, which may be a scheduling cell, where the at least one slot includes a plurality of control channel segments arranged at respective times within the slot, such as was illustrated in the examples of FIGS. 5-8. In a particular example, it is noted this arrangement at respective times may be seen by the illustration of slot 502 in FIG. 5 where each of the segments 506, 508, 512, and 512 are arranged at respective different times within the slot 502. Of further note, this arrangement could also be considered as an arrangement at respective different symbols within the slot, as it is understood by those skilled in the art that symbols occur in time within a slot for certain radio technologies. Additionally, it is noted that given the examples of FIGS. 7 and 8, segments may also include not only arrangement in respective times, but also in frequency as well. Additionally each of the control channel segments includes control information corresponding to respective slots for one or more second cells, which may be one or more scheduled cells that are scheduled by the first cell, such as in a cross carrier scheduling scenario.

After the method of block 1102 is completed, flow proceeds to block 1104 where the at least one slot is transmitted to one or more UEs, which are serviced by the one or more second cells. The at least one slot is configured to be usable by the one or more UEs for determining the control information.

According to further aspects, method 1100 includes the control channel being a physical downlink control channel (PDCCH) transmitted by the first cell to the one or more UEs in the one or more second cells. Additionally, method 110 includes The method of claim 1, wherein the control information comprises one or more of a grant for a physical downlink shared channel (PDSCH), a grant for physical uplink shared channel (PUSCH), downlink control indicators (DCIs) within a PDCCH, or a slot format indication.

In other aspects, method 1100 may include the characteristic where the control channel is configured with a subcarrier spacing (SCS) that is lower than an SCS of a traffic channel used in the one or more second cells. In still other aspects, method 1100 may include that at least one time span corresponding to one control channel segment includes two or more control segment components arranged in respective frequency bands.

In still further aspects, method 1100 may include associating each of the plurality of control channel segments with one or more particular slots in the one or more second cells. This associating each of the plurality of control channel segments with one or more particular slots in the one or more second cells may further comprise aligning each of the plurality of control channel segments to the timing of one or more particular slots in the one or more second cells.

In yet more aspects, method 1100 may include the one or more control channel segments containing respective control channel information corresponding to the slots in the one or more second cells. Additionally, the one or more control channel segments may contain the same control channel information corresponding to all of the slots in the one or more second cells.

In still further aspects, method 1100 may include setting a predetermined f number of DCIs that the UE is expected to decode that may be contained within each of the control channel segments for DCIs for each of the one or more second cells. Additionally, a predetermined maximum number of DCIs that the UE is expected to decode may be contained within each of the control channel segments for DCIs for all of the one or more second cells. In this case, the predetermined maximum number is determined based on the combination of a subcarrier spacing (SCS) of the control channel of the first cell and the SCS of at least one of the second cells. In another alternative, the predetermined maximum number is determined based on the subcarrier spacing (SCS) of the control channel of the first cell and cover all possible cases of the second cells (i.e., scheduled cells) SCSs. In certain other aspects, it is noted that a scheduling cell may also be its own scheduled cell. In such case, the scheduling cell (i.e., the first cell) may also be simultaneously considered one of the scheduled cells (i.e., one of the second cells) in the case where at least the maximum total number of DCIs per span is defined for all scheduled cells. As such, DCIs for the scheduling cell should be also counted in the total number of DCIs for all scheduled cells.

According to other aspects, method 1100 may include the control segment comprising a downlink control indicator (DCI), and setting a predetermined maximum number N of DCIs that a UE of the one or more UEs is expected to decode. Additionally, the method 1100 may include providing at least one unicast DCI for each slot of the second cell. In a further aspect, the method 1100 may include the second cell comprising a scheduled cell of a plurality of scheduled cells. When a number of second, scheduled cells K is more than one and less than or equal to a predetermined number L, the maximum number of DCIs that the UE is expected to decode for all of the plurality of scheduled cells is set equal to K×N. In still other aspects, when the number of scheduled cells N is greater than the value L, the maximum number of DCIs that the UE is expected to decode for all of the plurality of scheduled cells is equal to L×N.

In still further aspects, method 1100 may include the control segment comprising a downlink control indicator (DCI), where the DCI is configured to include one of a plurality of format types of DCIs that are supported by a UE of the one or more UEs. Method 1100 may also feature that the plurality of format types includes one or more of a DCI for unicast transmission, a DCI for semi-persistent scheduling (SPS) activation/deactivation, a DCI for broadcast transmission, a DCI for random access and paging, a DCI for system information transmission, or a group common DCI. Further, the DCI for unicast transmission may include one or more of a DCI for uplink (UL) and downlink (DL) unicast transmission, a DCI for DL unicast transmission; or a DCI for UL unicast transmission.

Figure 12:
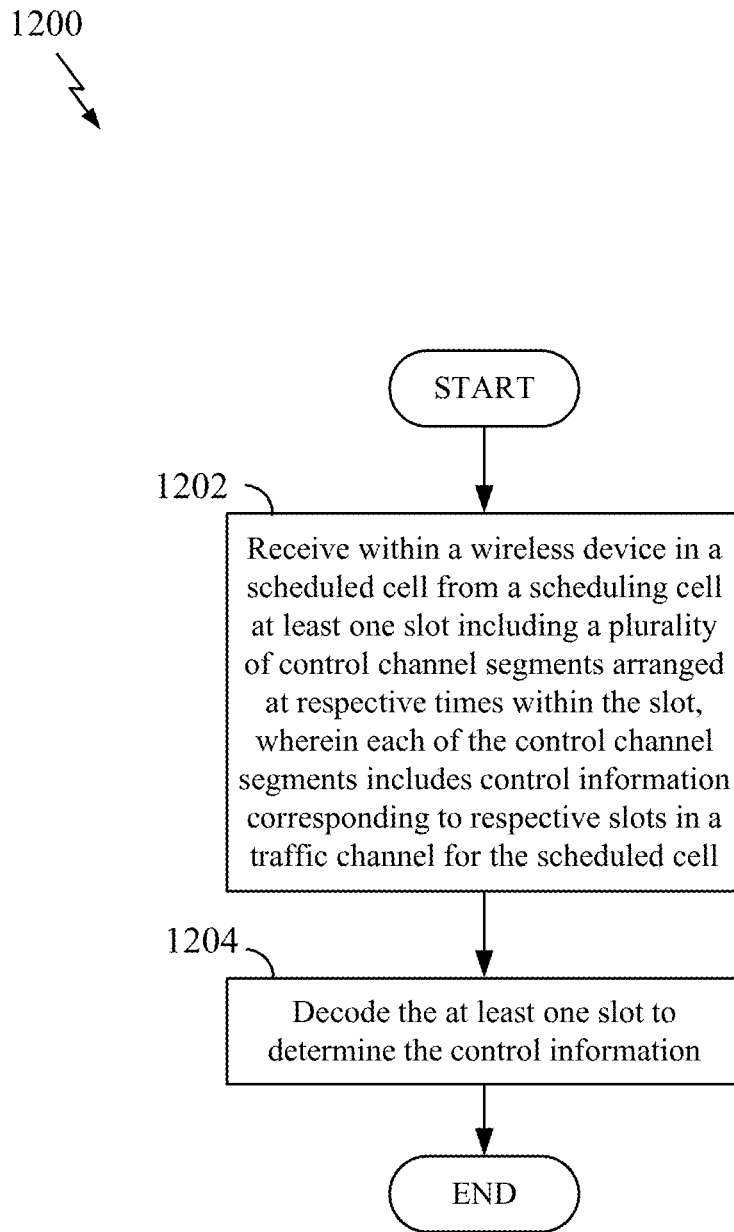
FIG. 12 is another flow diagram of an exemplary method for receiving transmissions in a wireless system according to exemplary aspects of the present disclosure.

FIG. 12 is a flow chart illustrating an exemplary method 1200 for wireless communication in accordance with some aspects of the present disclosure. As described below, some or all illustrated features may be omitted in a particular implementation within the scope of the present disclosure, and some illustrated features may not be required for implementation of all embodiments. In some examples, the method 1200 may be carried out by the scheduled entity 1000 illustrated in FIG. 10. In some examples, the method 1200 may be carried out by any suitable apparatus or means for carrying out the functions or algorithm described below.

As illustrated at block 1202, method 1200 includes receiving in a wireless device, such as a UE, in a scheduled cell from a scheduling cell at least one slot including a plurality of control channel segments arranged at respective times within the slot, wherein each of the control channel segments includes control information corresponding to respective slots in a traffic channel for the scheduled cell. An example of the arrangement of the received segments at respective times may be seen by the illustration of slot 502 in FIG. 5 where each of the segments 506, 508, 510, and 512 are arranged at respective different times within the slot 502. Of further note, this arrangement could also be considered as an arrangement at respective different symbols within the slot, as it is understood by those skilled in the art that symbols occur in time within a slot for certain radio technologies. Additionally, it is noted that given the examples of FIGS. 7 and 8, segments may also include not only arrangement in respective times, but also in frequency as well. After receipt of the at least one slot, method 1200 includes decoding, within the wireless device, the at least one slot to determine the control information as shown at block 1204.

According to further aspects, method 1200 includes the control channel being a physical downlink control channel (PDCCH) transmitted by the scheduling cell to the wireless device. Moreover, the control information comprises one or more of a grant for a physical downlink shared channel (PDSCH), a grant for physical uplink shared channel (PUSCH), downlink control indicators (DCIs) within a PDCCH, or a slot format indication.

According to still further aspects, method 1200 includes the control channel being configured for or used for cross carrier scheduling of the wireless device by the scheduling cell. Additionally, the control channel is configured with a subcarrier spacing (SCS) that is lower than an SCS of a traffic channel, such as PDSCH, used by the scheduled cell.

In yet further aspects, method 1200 further includes receiving a traffic channel (e.g., PDSCH) in the wireless device, and then decoding the traffic channel based on the decoded control information, such as DCI.

In still other aspects, method 1200 includes at least one time span corresponding to one control channel segment including two or more control segment components arranged in respective frequency bands. Furthermore, each of the plurality of control channel segments is associated with one or more particular slots in the scheduled cell.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-12 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. An apparatus for wireless communication, comprising:
   at least one memory; and
   at least one processor coupled to the at least one memory, wherein the apparatus is configured to:
   transmit, within at least one slot of a first cell associated with a first subcarrier spacing (SCS), up to a maximum number of downlink control information (DCI) for one or more second cells, wherein:
   the one or more second cells are associated with one or more second SCSs; and
   the maximum number of DCI is based on the first SCS of the first cell and a second SCS of the one or more second SCSs of the one or more second cells.

2. The apparatus of claim 1, wherein the apparatus is configured to:
   perform one or more transmissions using one or more assigned resources associated with the one or more second cells, wherein one or more DCI of the up to the maximum number of DCI indicate the one or more assigned resources.

3. The apparatus of claim 1, wherein the apparatus is configured to:
   receive one or more transmissions using one or more assigned resources associated with the one or more second cells, wherein one or more DCI of the up to the maximum number of DCI indicate the one or more assigned resources.

4. The apparatus of claim 1, wherein the first cell comprises a scheduling cell and the one or more second cells comprise scheduled cells that are scheduled by the first cell.

5. The apparatus of claim 1, wherein one or more DCI of the up to the maximum number of DCI are transmitted via a physical downlink control channel (PDCCH) associated with the first cell to one or more user equipments (UEs) associated with the one or more second cells.

6. The apparatus of claim 5, wherein the apparatus is configured to:
   transmit cross carrier scheduling information for the one or more second cells via the PDCCH.

7. The apparatus of claim 1, wherein one or more DCI of the up to the maximum number of DCI comprises one or more of: a grant for a physical downlink shared channel (PDSCH), a grant for physical uplink shared channel (PUSCH), a DCI within a PDCCH, or a slot format indication.

8. The apparatus of claim 1, wherein the first SCS is different than the second SCS.

9. The apparatus of claim 1, wherein the apparatus is configured to:
   associate each DCI of the up to the maximum number of DCI with one or more slots in the one or more second cells.

10. The apparatus of claim 9, wherein, to associate each DCI of the up to the maximum number of DCI with the one or more slots in the one or more second cells, the apparatus is configured to align each DCI of the up to the maximum number of DCI to a timing of the one or more slots in the one or more second cells.

11. The apparatus of claim 1, wherein each DCI of the up to the maximum number of DCI comprises respective control channel information corresponding to one or more slots of the one or more second cells.

12. The apparatus of claim 1, wherein each DCI of the up to the maximum number of DCI comprises a same control channel information corresponding to one or more slots of the one or more second cells.

13. The apparatus of claim 1, wherein the maximum number of DCI is based on respective SCSs of the one or more second cells.

14. The apparatus of claim 1, wherein the apparatus is configured to:
   set the maximum number of DCI equal to a number of DCI that a user equipment (UE) is to detect for the at least one slot of the first cell.

15. The apparatus of claim 14, wherein one or more DCI of the up to the maximum number of DCI are unicast DCI.

16. The apparatus of claim 14, wherein to transmit the up to the maximum number of DCI, the apparatus is configured to:
   transmit at least one unicast DCI for each slot of the one or more second cells.

17. The apparatus of claim 1, wherein each DCI of the up to the maximum number of DCI comprises one of a plurality of format types of DCI that are supported by a user equipment (UE), wherein the plurality of format types comprises one or more of: a DCI format for unicast transmission, a DCI format for semi-persistent scheduling (SPS) activation/deactivation, a DCI format for broadcast transmission, a DCI format for random access and paging, a DCI format for system information transmission, or a group common DCI format.

18. The apparatus of claim 17, wherein the DCI format for unicast transmission comprises one or more of: a DCI for uplink (UL) and downlink (DL) unicast transmission, a DCI for DL unicast transmission; or a DCI for UL unicast transmission.

19. The apparatus of claim 1, wherein the apparatus is configured to:
set the maximum number of DCI equal to a number of DCI for the at least one slot of the first cell.

20. The apparatus of claim 1, wherein the maximum number of DCI is equal to a number of DCI for the at least one slot of the first cell.

21. The apparatus of claim 1, wherein the maximum number of DCI is equal to a number of DCI that a user equipment (UE) is to detect for the at least one slot of the first cell.

22. The apparatus of claim 1, wherein each DCI of the up to the maximum number of DCI comprises a respective DCI for unicast transmission.

23. The apparatus of claim 1, wherein each DCI of the up to the maximum number of DCI comprises a respective DCI for downlink unicast transmission.

24. The apparatus of claim 1, wherein each DCI of the up to the maximum number of DCI comprises a respective DCI for uplink unicast transmission.

25. An apparatus for wireless communication, comprising:
at least one memory; and
at least one processor coupled to the at least one memory, wherein the apparatus is configured to:
detect, within at least one slot of a first cell associated with a first subcarrier spacing (SCS), up to the maximum number of downlink control information (DCI) for one or more second cells, wherein:
the one or more second cells are associated with one or more second SCSs; and
the maximum number of DCI is based on the first SCS of the first cell and a second SCS of the one or more second SCSs of the one or more second cells.

26. The apparatus of claim 25, wherein the apparatus is configured to:
receive one or more transmissions using one or more assigned resources associated with the one or more second cells, wherein one or more DCI of the up to the maximum number of DCI indicate the one or more assigned resources.

27. The apparatus of claim 25, wherein the apparatus is configured to:
transmit one or more transmissions using one or more assigned resources associated with the one or more second cells, wherein one or more DCI of the up to the maximum number of DCI indicate the one or more assigned resources.

28. The apparatus of claim 25, wherein the first cell comprises a scheduling cell and the one or more second cells comprise scheduled cells that are scheduled by the first cell.

29. The apparatus of claim 25, wherein the up to the maximum number of DCI, are received via a physical downlink control channel (PDCCH) associated with the first cell.

30. The apparatus of claim 29, wherein the apparatus is configured to:
receive cross carrier scheduling information for the one or more second cells via the PDCCH.

31. The apparatus of claim 25, wherein one or more DCI of the up to the maximum number of DCI comprises one or more of: a grant for a physical downlink shared channel (PDSCH), a grant for physical uplink shared channel (PUSCH), a downlink control indicators within a PDCCH, or a slot format indication.

32. The apparatus of claim 25, wherein the first SCS is different than the second SCS.

33. The apparatus of claim 25, wherein the apparatus is configured to:
associate each DCI of the up to the maximum number of DCI with one or more slots in the one or more second cells.

34. The apparatus of claim 33, wherein, to associate each DCI of the up to the maximum number of DCI with the one or more slots in the one or more second cells, the apparatus is configured to align each DCI of the up to the maximum number of DCI to a timing of the one or more slots in the one or more second cells.

35. The apparatus of claim 25, wherein each DCI of the up to the maximum number of DCI comprises respective control channel information corresponding to one or more slots of the one or more second cells.

36. The apparatus of claim 25, wherein each DCI of the up to the maximum number of DCI comprises a same control channel information corresponding to one or more slots of the one or more second cells.

37. The apparatus of claim 25, wherein the maximum number of DCI is based on respective SCSs of the one or more second cells.

38. The apparatus of claim 25, wherein to receive the up to the maximum number of DCI, the apparatus is configured to:
receive at least one unicast DCI for each slot of the one or more second cells.

39. The apparatus of claim 25, wherein each DCI of the up to the maximum number of DCI comprises one of a plurality of format types of DCI that are supported by a user equipment (UE), wherein the plurality of format types comprises one or more of: a DCI format for unicast transmission, a DCI format for semi-persistent scheduling (SPS) activation/deactivation, a DCI format for broadcast transmission, a DCI format for random access and paging, a DCI format for system information transmission, or a group common DCI format.

40. The apparatus of claim 39, wherein the DCI format for unicast transmission comprises one or more of: a DCI for uplink (UL) and downlink (DL) unicast transmission, a DCI for DL unicast transmission; or a DCI for UL unicast transmission.

41. The apparatus of claim 25, wherein the first SCS is lower than the second SCS.

* * * * *

UNITED STATES PATENT AND TRADEMARK OFFICE
CERTIFICATE OF CORRECTION

PATENT NO. : 11,956,779 B2
APPLICATION NO. : 17/826342
DATED : April 9, 2024
INVENTOR(S) : Xu et al.

Page 1 of 1

It is certified that error appears in the above-identified patent and that said Letters Patent is hereby corrected as shown below:

In the Claims

Claim 25, Column 25, Line 43 should read:
"a first subcarrier spacing (SCS), up to a maximum"

Signed and Sealed this
Twenty-third Day of July, 2024

Katherine Kelly Vidal
*Director of the United States Patent and Trademark Office*